No. 727,494. PATENTED MAY 5, 1903.
G. F. THOMPSON.
GATE LATCH.
APPLICATION FILED NOV. 21, 1902.
NO MODEL.

Witnesses
Edwin G. McKee
Chas. S. Hyer.

Inventor
George F. Thompson
By Victor J. Evans
Attorney

No. 727,494.

Patented May 5, 1903.

UNITED STATES PATENT OFFICE.

GEORGE F. THOMPSON, OF CONWAY, IOWA.

GATE-LATCH.

SPECIFICATION forming part of Letters Patent No. 727,494, dated May 5, 1903.

Application filed November 21, 1902. Serial No. 132,269. (No model.)

*To all whom it may concern:*

Be it known that I, GEORGE F. THOMPSON, a citizen of the United States, residing at Conway, in the county of Taylor and State of Iowa, have invented new and useful Improvements in Gate-Latches, of which the following is a specification.

This invention relates to gate-latches; and the object in view is to provide a simple and effective device of this character which can be easily operated, readily applied, and comparatively inexpensive in the cost of manufacture.

The invention consists in the construction and arrangement of the several parts, which will be more fully hereinafter described and claimed.

Figure 1:
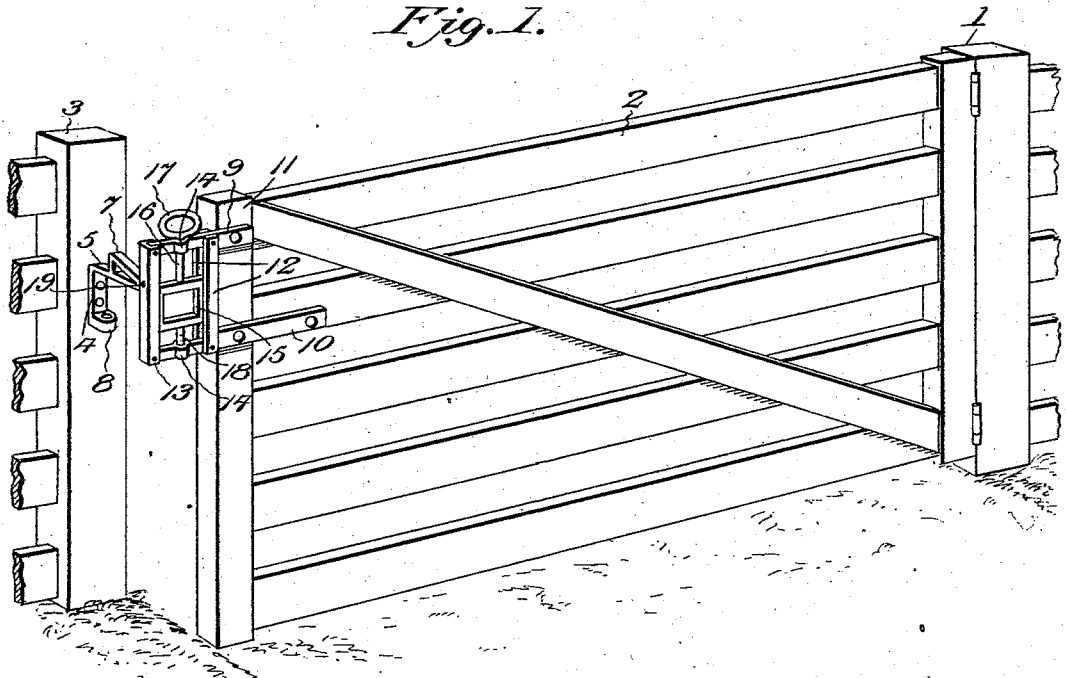
Figure 2:
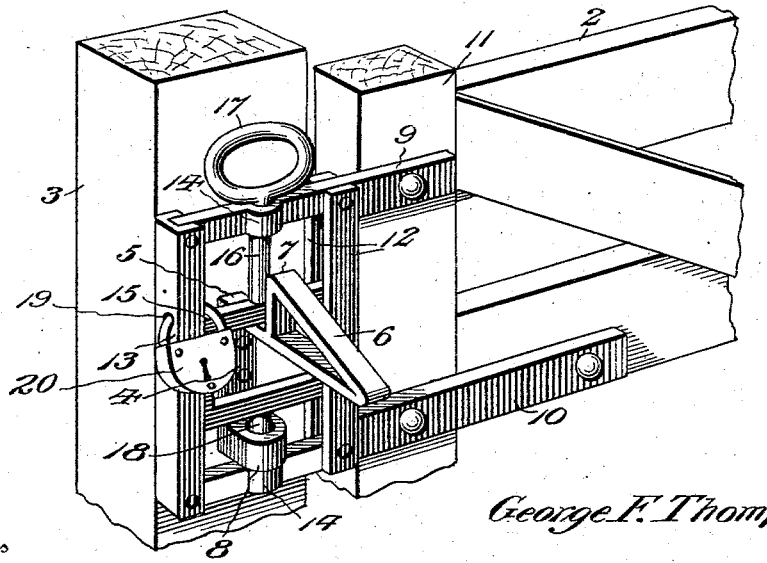

In the drawings, Figure 1 is a perspective view of a gate and posts therefor, showing the improved latch applied to the gate to coöperate with a striker on one of the posts, the gate being illustrated as open. Fig. 2 is an enlarged detail perspective view of a portion of the gate and one of the posts, showing the latch and striker in engaged position.

Similar numerals of reference are employed to indicate corresponding parts in the views.

The numeral 1 designates a hinge-post, to which a gate 2 is secured by suitable hinges to be movable in relation to a second post 3, carrying a striker 4. The striker 4 is constructed from a suitable bar of metal, having an upper horizontal member 5 with an angular projection 6 to form a rear locking-shoulder 7 and a lower outwardly-extending vertically-apertured lug 8. On the upper portion of the free end of the gate a pair of bars 9 and 10 are secured and disposed in longitudinal alinement in spaced relation, the lower bar 10 being longer than the upper bar 9 to provide a more rigid support. Close to the stile 11 at the free end of the gate a pair of vertically-arranged strips 12 are secured to the opposite sides of the bars 9 and 10 to form an inner guide, and the outer terminals of the said bars are connected by a U-shaped or channeled strip 13 to form an outer guide. The bars 9 and 10 are projected a suitable distance from the stile 11, and each has a guide-loop 14 formed therein, said loop being in vertical alinement.

Movably mounted in the inner and outer guides 12 and 13 to have free vertical elevation and depression is an open latch-frame 15, from the center of the upper edge of which a guide-rod 16 projects upwardly and loosely through the loop 14 of the upper bar 9 and terminates in a grip 17 of oval form, though other shapes may be adopted, as desired. From the center of the lower member of the latch-frame a bolt-rod 18 projects and is adapted to engage the apertured lug 8 at the bottom of the striker 4. The opening through the frame 15 is large enough to permit the angular projection 6 to freely pass therethrough, and when the gate is closed and the latch in locking position the upper member of the said frame 15 catches behind the shoulder 7 and the bolt 18 enters the apertured lug 8, thereby securely fastening the gate against accidental opening. In closing the gate the outer free end of the angular projection 6 moves through the opening in the latch-frame 15 and the latter is gradually raised until the shoulder 7 is clear, when said frame will automatically fall and lock the gate closed, it being understood that the said free end of the angular projection 6 is in alinement with the opening in the latch-frame 15 when the latter is in its lowered position. In releasing the gate the latch-frame is elevated through the grip 17 and guide-rod 16 until the shoulder 7 is cleared, when the gate can be pulled open at will.

The improved latch is comparatively inexpensive in the cost of manufacture and can be readily applied and always tends to hold the gate in normal position when closed and removes a material portion of the weight strain from the hinges.

In the construction of the improved device it is preferred to slightly reduce the portions of the bars 9 and 10 which are projected outwardly from the stile 11 of the gate, so as to increase the amplitude of vertical movement of the latch-frame 15 in the guides 12 and 14 without necessitating an increase of distance between the bars 9 and 10 and the length of the said guides to arrive at the result sought. It will also be seen that in the present form of latch two locking-points are produced through the medium of the shoulder 7 and the apertured lug 8, and by such provision the improved latch is rendered more durable and positive in its operation, as the strain is distributed over or applied to different portions of the striker.

When the gate closes, the lower loop 14 passes under the apertured lug 8, and the bolt 18, depending from the latch-frame 15, is projected through the lug and enters the said lower loop, and before the gate can be released a complete clearance of the bolt 18 from the lug and lower loop 15 is necessary, as well as a disengagement of the upper part of the frame 15 from the shoulder 7. At a suitable elevation the strip 13 is formed with an opening 19, through which the shackle of a lock 20 is adapted to be inserted, as clearly shown by Fig. 2, to hold the latch-frame against upward movement to lock the gate closed.

Changes in the proportions, dimensions, and minor details of construction may be resorted to without departing from the spirit of the invention.

Having thus fully described the invention, what is claimed as new is—

1. A gate-latch, comprising a latch-frame movable in relation to upper and lower guides and having an opening therethrough and a depending bolt, and a striker having an upper angular projection and a lower apertured lug.

2. A gate-latch, comprising a vertically-movable latch-frame with an opening therethrough provided with a depending bolt, and a striker having an upper shoulder and a lower apertured member to respectively receive portions of the frame and bolt.

3. A gate-latch, comprising a vertically-movable latch-frame having an opening therethrough and a depending bolt, the upper part of the frame having means for manually elevating it, and a striker having an upper angular projection and a lower apertured member.

4. A gate-latch, comprising bars having guide-loops formed therein, guides secured to said bars, a latch-frame having an opening therethrough and movable in the said guide, the upper part of the frame being provided with a guide-rod movable in the upper guide-loop and the lower part of the frame with a depending bolt to engage the lower guide-loop, and a striker having an upper angular projection and a lower apertured lug.

In testimony whereof I affix my signature in presence of two witnesses.

GEORGE F. THOMPSON.

Witnesses:
W. T. FAWCETT,
HUGH BOWEN.